(12) United States Patent
Lokhoff

(10) Patent No.: US 6,754,354 B1
(45) Date of Patent: Jun. 22, 2004

(54) AUDIO SYSTEM AND AUDIO INTERFACE

(75) Inventor: Gerardus C. P. Lokhoff, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/622,318

(22) PCT Filed: Dec. 13, 1999

(86) PCT No.: PCT/EP99/09826

§ 371 (c)(1),
(2), (4) Date: Aug. 14, 2000

(87) PCT Pub. No.: WO00/36758

PCT Pub. Date: Jun. 22, 2000

(30) Foreign Application Priority Data

Dec. 15, 1998 (EP) ............................................ 98204251

(51) Int. Cl.$^7$ ................................................ H04B 1/20
(52) U.S. Cl. ...................... 381/77; 381/79; 340/825.24; 340/825.25; 369/47.12
(58) Field of Search ................. 381/77, 79; 340/825.24, 340/825.25; 725/135; 700/94

(56) References Cited

U.S. PATENT DOCUMENTS

| 5,313,524 | A | * | 5/1994 | Van Hulle et al. | ........... 381/105 |
| 5,706,308 | A | * | 1/1998 | Ichimura | ..................... 375/247 |
| 5,802,017 | A | * | 9/1998 | Sato et al. | ..................... 369/2 |
| 6,034,832 | A | * | 3/2000 | Ichimura et al. | .............. 360/60 |

FOREIGN PATENT DOCUMENTS

| EP | 0542345 A3 | 11/1992 | ............ H04B/1/20 |
| EP | 0542345 A2 | 5/1993 | ............ H04B/1/20 |

* cited by examiner

*Primary Examiner*—Minsun Oh Harvey
*Assistant Examiner*—Justin Michalski

(57) ABSTRACT

Audio systems using a digital audio interface between a sender and a receiver are known. Due to the digital revolution, it is very easy to make copies of copyright protected work. By using a bi-directional control bus in the audio interface, it is made possible to send audio signals with a standard quality to "normal" receivers audio, and higher quality audio to receivers which are authorized to receive higher quality audio.

8 Claims, 1 Drawing Sheet

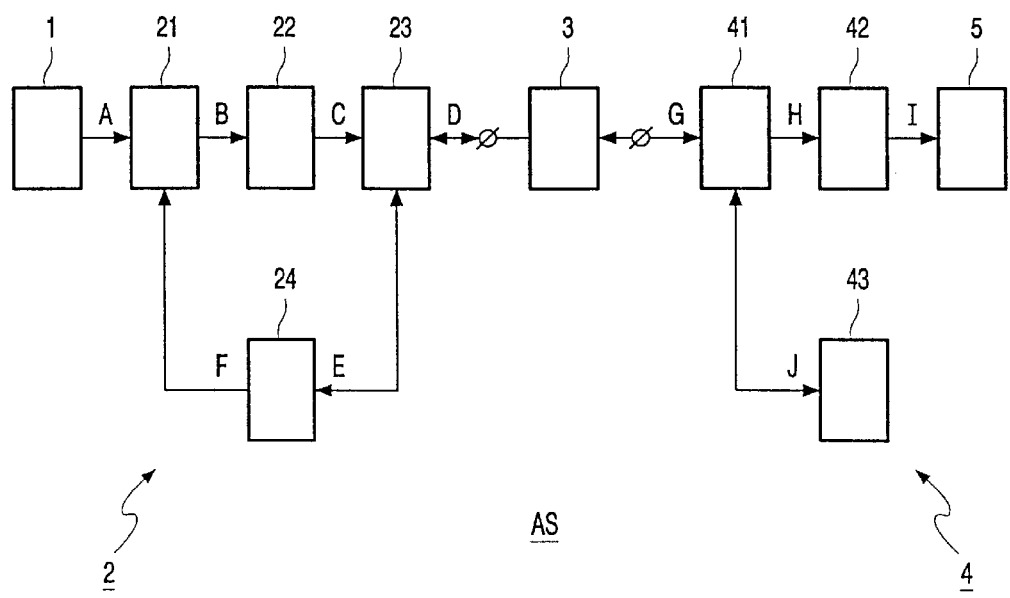

AUDIO SYSTEM AND AUDIO INTERFACE

BACKGROUND OF THE INVENTION

1. Field of the Invention

The invention relates to an audio system comprising an audio interface. The invention further relates to an audio interface for use in such an audio system.

2. Description of the Related Art

Audio systems and audio interfaces are known in the art. For example, such interfaces are used with CD-players, DAT and MD recorders, etc. In a consumer implementation, the quality is, in most cases, restricted to 16-bit linear PCT format, with a sample rate of 32, 44.1 or 48 kHz. However, the latest consumer electronics products can perform at a higher quality, for example, by using 24-bit samples or a sample rate of 88.2, 176.4 or 192 kHz. The present digital audio interface specification can be used for 24-bit samples, however, not for higher sample rate frequencies.

Further, the protection of the rights of the author and supplier of a copyright protected work is a main concern of the suppliers of such work. Due to the digital revolution, making a (almost) perfect copy is becoming very easy. As a consequence, no copyright is paid. The suppliers ask regularly for technical measures to restrict the possibilities of copying and, preferably, to make copying impossible.

SUMMARY OF THE INVENTION

It is, inter alia, an object of the invention to provide an audio system and an audio interface that overcomes the drawbacks of the prior art.

To this end, a first aspect of the invention provides an audio system comprising a sender device, an audio interface and a receiver device, whereby the sender device is arranged to receive a first audio signal from an audio source, converting means for converting the first audio signal into a second audio signal, and to supply the second audio signal via the audio interface to the receiver device, and the receiver device is arranged to receive the second audio signal, converting means for converting the second audio signal into a third audio signal, and supply the third audio signal to an audio destination, characterized in that the audio interface comprises a bi-directional bus for sending control signals between the sender device and the receiver device.

A second aspect of the invention provides an audio interface for use in such an audio system.

A third aspect of the invention provides a receiver device for use in such an audio system.

By using a bi-directional control bus, it is made possible to amend the audio signal in the sender device, to make it suitable for the receiver device. Further, in this way, it is made possible to let the receiver device first make a request of allowance to receive high quality audio and, after allowance, to receive it.

When no request is made, the sender device will send, for example, the normal audio quality.

It is mentioned here that European Patent Application No. EP-A-0542345, corresponding to U.S. Pat. No. 5,313,524 (PHN 13,883), discloses an active sound reproducer and control unit which uses a bi-directional control bus as a control channel to supply remote control commands.

In an embodiment of an audio system, according to the invention, the sender device comprises a control unit for sending and receiving the control signals to a control unit of the receiver device.

With both the sender device and the receiver device having a control unit, the control signals will be supplied and received by the respective control unit. The control units further can control the audio signal quality to be sent and to be received.

In an embodiment of an audio interface, according to the invention, a first part of the audio interface is incorporated in the sender device and a second part of the audio interface is incorporated in the receiver device.

By splitting the audio interface into a sender and a receiver part, the devices themselves are all to communicate with the other.

BRIEF DESCRIPTION OF THE DRAWING

The invention and additional features, which may optionally be used to advantage, will be apparent from and elucidated with reference to the examples described below hereinafter and shown in the figure, in which:

The FIGURE shows a schematic example of an audio system according to the invention.

DESCRIPTION OF THE PREFERRED EMBODIMENT

The FIGURE shows a schematic example of an audio system AS according to the invention, comprising an audio source 1, for example, an optical or magnetically stored audio signal. The source supplies an audio signal A to a sender device 2. The sender device 2 comprises, in this example, a formatting unit 21, a converting unit 22, a combining unit 23 and a control unit 24.

The formatting unit 21 receives the signal A from the audio source 1 and supplies a signal B. In this formatting unit, the audio signal can be formatted by, for example, amending the number of bits in the samples, the sampling frequency, adding special signals (such as copyright protection or amending the possibilities of the receiver).

It is to be noted that preferably, the signal A can be amended into a signal B that satisfies the minimum requirements of the receiver 4. The control unit 24 with the signal F controls the amending of the signal A.

The signal B is supplied to the converting unit 22. In the converting unit, the signal B is, in this example, converted into a signal satisfying the requirements of the specification IEC958, or a later-derived version thereof, having, for example, a higher sample rate frequency. The converting unit 22 can convert the signal B by itself (or, in another example, be controlled by the control unit 24). The converting unit supplies a signal C to the combining unit 23. In the combining unit, the signal C is combined with bi-directional control signals E from the control unit 24, and supplied as a signal D to a digital audio interface 3.

The digital audio interface supplies a signal G to a receiver device 4. The receiver device comprises, in this example, a combining unit 41, a converting unit 42 and a control unit 43. The combining unit splits the received signal G, comprising an audio signal and control signals, into an audio signal H (substantially the same as signal C in the sender device 2) and bi-directional control signals J. The combining unit further sends back control signals via the audio interface 3 to the sender device 2. The converting unit 42 converts the audio signal H (in this example, in the IEC958 format) back into a digital audio signal I (substantially the same as signal B in the sender device 2). The signal I is supplied to an audio destination 5 (for example, a DAT, CD recordable or MD recorder, etc).

Between both control units 24 and 43 in, respectively, the sender device 2 and the receiver device 4, a negotiation process is performed, whereby the sender device amends the audio signal as required by the receiver device. As an example, a situation is described below wherein a high quality may only be supplied to receiver devices that are allowed to receive these signals.

The sender device, at first instance, uses an audio signal with normal audio quality, for example, 16-bit samples, 48 kHz sample rate frequency. Herewith, a receiver device that is not allowed the high quality audio signal can use this audio signal to make recordings. Hereafter, the sender device sends a message via the bi-directional control bus (digital audio interface 3). European Patent Application No. EP-A-0542345 describes an active sound reproducer and control unit which uses a bi-directional bus as a control channel to supply remote control commands. In the subject invention, a connected receiver device reacts to this message by sending back a message denoting authorization for receiving high quality audio signals. When the sender device receives this message, the control unit 24 sends a signal F to the formatting unit 21 to amend the audio signal to, for example, 24-bit samples, 96 kHz sample rate frequency. If the authorization is not sent by the receiver device (for example, when a receiver devices not having such an authorization is used), the sender device continues to send the audio signal with the "normal" bit length and sample rate.

In this way, it is possible to combine the audio system and audio interface with existing receiver devices, and, on the other hand, supply new receiver devices having authorization for high quality audio signals, with these high quality audio signals.

It is to be noted that the audio system and the audio interface of the invention has been described on the basis of an example. The man skilled in the art will be well aware of many variations, which fall within the scope of the present invention.

In the above described example, the converting unit 22 converts the signal into a signal satisfying the requirements of the specification IEC958 or a later-derived version thereof. It will be clear that it is also possible that the converting unit converts the signal B into a signal satisfying another specification as long as the specification can be received by the receiver 4.

What is claimed is:

1. An audio system comprising:
    a sender device for receiving a first audio signal and for generating a transmission signal, said sender device comprising first converting means for selectively converting said first audio signal into a second audio signal, said second audio signal having a higher quality than said first audio signal, transmitting means for converting said first audio signal and said second audio signal into said transmission signal, and a first control unit for generating first control signals and being responsive to second control signals for controlling said first converting means to convert said first audio signal into said second audio signal;
    an audio interface for receiving said transmission signal and said first control signal from said sender device;
    at least one first receiver device coupleable to said audio interface for receiving said transmission signal, said first receiver device comprising second converting means for converting said transmission signal into a third audio signal corresponding to said first audio signal, and means for applying said third audio signal to an audio destination; and
    at least one second receiver device also coupleable to said audio interface for receiving said transmission signal, said second receiver device comprising a second control unit for receiving said first control signal and, in response thereto, for generating said second control signal, third converting means for selectively converting said transmission signal into a fourth audio signal corresponding to said first audio signal when said second control unit does not receive said first control signal, or into a fifth audio signal corresponding to said second audio signal when said second control unit receives said first control signal and generates said second control signal, and means for applying said fourth or fifth audio signal to an audio destination.

2. The audio system as claimed in claim 1, wherein the transmission means combines the first or second audio signal and the first control signals to form the transmission signal.

3. The audio system as claimed in claim 2, wherein the audio interface comprises bi-directional bus means for carrying the transmission signal from the sender device to said at least one first receiver device and said at least one second receiver device, and for carrying the second control signal from said at least one second receiver device to the sender device.

4. The audio system as claimed in claim 1, wherein said second audio signal has a larger number of bits per sample than said first audio signal.

5. The audio system as claimed in claim 4, wherein said first audio signal has 16-bit samples while said second audio signal has 24-bit samples.

6. The audio system as claimed in claim 1, wherein said second audio signal has a higher sampling rate than said first audio signal.

7. The audio system as claimed in claim 6, wherein said second audio signal has a sampling rate of 88.2, 176.4 or 192 kHz, and said first audio signal has a sampling rate of 23, 44.2 or 48 kHz.

8. A second receiver device for use in the audio system as claimed in claim 1.

* * * * *